(12) United States Patent
Kagawa

(10) Patent No.: US 10,699,173 B2
(45) Date of Patent: Jun. 30, 2020

(54) RECORDING TAPE CARTRIDGE, BARCODE READING SYSTEM, AND BARCODE READING METHOD

(71) Applicant: FUJIFILM CORPORATION, Minato-ku, Tokyo (JP)

(72) Inventor: Yusuke Kagawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/525,615

(22) Filed: Jul. 30, 2019

(65) Prior Publication Data
US 2020/0104665 A1 Apr. 2, 2020

(30) Foreign Application Priority Data

Sep. 28, 2018 (JP) .................. 2018-184310

(51) Int. Cl.
*G06K 19/06* (2006.01)
*G11B 33/02* (2006.01)
*G06K 7/10* (2006.01)

(52) U.S. Cl.
CPC ... *G06K 19/06075* (2013.01); *G06K 7/10544* (2013.01); *G11B 33/025* (2013.01)

(58) Field of Classification Search
None
See application file for complete search history.

(56) References Cited

U.S. PATENT DOCUMENTS

| 2009/0242680 A1* | 10/2009 | Onmori | G11B 23/037 242/348 |
| 2009/0242681 A1* | 10/2009 | Sumiya | G11B 23/107 242/348 |
| 2010/0164726 A1* | 7/2010 | Tada | H01Q 1/36 340/572.7 |
| 2018/0232619 A1* | 8/2018 | Kagawa | G06K 19/0723 |

FOREIGN PATENT DOCUMENTS

JP 2007-226630 A 9/2007

* cited by examiner

*Primary Examiner* — Kristy A Haupt
(74) *Attorney, Agent, or Firm* — Solaris Intellectual Property Group, PLLC

(57) ABSTRACT

A recording tape cartridge includes a case configured by first and second halves being joined to each other first and second peripheral walls are butted against each other and stores a reel, a label surface formed of a first half label surface of the first peripheral wall and a second half label surface of the second peripheral wall on a side opposite to a loading direction of the case to a drive device and that allows a barcode label with a one-dimensional or two-dimensional barcode to be attached thereto, and a reference surface formed on a bottom plate and is used for positioning the case in a thickness direction in a case of being loaded into the drive device. The first or second half label surface is inclined at one degree or more with respect to a vertical plane perpendicular to the reference surface in a side view.

16 Claims, 11 Drawing Sheets

RECORDING TAPE CARTRIDGE, BARCODE READING SYSTEM, AND BARCODE READING METHOD

CROSS-REFERENCE TO RELATED APPLICATION

This application claims priority from Japanese Patent Application No. 2018-184310, filed on Sep. 28, 2018, the disclosure of which is incorporated by reference herein in its entirety.

BACKGROUND

Field of the Invention

The present disclosure relates to a recording tape cartridge, a barcode reading system, and a barcode reading method.

Related Art

There is a case where a plurality of recording tape cartridges to be used as external record media of a computer or the like are stored and kept in a storage referred to as a library. In a case where a desired recording tape cartridge is loaded into a drive device, the recording tape cartridge has a rear part gripped by a robot hand provided in the library and thereby, is taken out from the library and loaded into the drive device.

Meanwhile, an individual recording tape cartridge stored in the library is individually identified by the number (barcode) of a barcode label attached to a label surface of a rear wall. In the library, from a viewpoint of space saving, there is a case where the robot hand is provided with a barcode reading device. That is, in a case where the robot hand grips a rear part of the recording tape cartridge, the barcode of the barcode label attached to the label surface of the rear wall is read by the barcode reading device.

The barcode reading device comprises a light source that radiates light toward the barcode label, and a light-receiving unit that receives reflected light reflected by the barcode label, and reads the barcode by the reflected light (for example, refer to JP2007-226630A). In a case where the barcode cannot be read by the barcode reading device, the desired recording tape cartridge cannot be identified in the library. Therefore, the barcode reading device is required to have stable readability.

However, in a case where the barcode is read by the barcode reading device, halation is caused if the reflected light, which is radiated from the light source, is reflected by the barcode label, and is received by the light-receiving unit, is close to regular reflection. If the halation occurs, bars (black portions) and spaces (black portions) of the barcode are not distinguished from each other, and poor reading is caused.

For that reason, it is desired to suppress that the reflected light is close to the regular reflection. However, in order to suppress the reflected light is close to the regular reflection, it is necessary to keep the distance between the light source and the light-receiving unit, and to apply a radiation angle. However, in recent years, there is a tendency to downsize the robot hand. Along with the downsize of the robot hand, it is difficult to secure a sufficient space for the light source and the light-receiving unit of the barcode reading device.

SUMMARY

An object of the present disclosure is to provide a recording tape cartridge, a barcode reading system comprising the same, and a barcode reading method that can suppress that reflected light reflected by the barcode label is close to regular reflection, and can improve the readability of a barcode by the barcode reading device.

In order to achieve the above object, a recording tape cartridge of a first aspect related to the present disclosure comprises a case that is configured by a first half in which a first peripheral wall is erected around a rectangular top plate and a second half in which a second peripheral wall is erected around a rectangular bottom plate being joined to each other in a state where the first peripheral wall and the second peripheral wall are butted against each other, and that stores a reel around which the recording tape is wound; a label surface that is formed of a first half label surface of the first peripheral wall and a second half label surface of the second peripheral wall on a side opposite to a loading direction of the case to a drive device and that allows a label on which individual identification information is recorded with a one-dimensional or two-dimensional barcode to be attached thereto; and a reference surface that is formed on the bottom plate and is used for positioning the case in a thickness direction in a case of being loaded into the drive device, and the first half label surface or the second half label surface is inclined at one degree or more with respect to a vertical plane perpendicular to the reference surface as seen from a direction orthogonal to an axial direction of the reel and the loading direction to the drive device.

A recording tape cartridge of a second aspect related to the present disclosure comprises a case that is configured by a first half in which a first peripheral wall is erected around a rectangular top plate and a second half in which a second peripheral wall is erected around a rectangular bottom plate being joined to each other in a state where the first peripheral wall and the second peripheral wall are butted against each other, and that stores a reel around which the recording tape is wound; a label surface that is formed of a first half label surface of the first peripheral wall and a second half label surface of the second peripheral wall on a side opposite to a loading direction of the case to a drive device and that allows a label on which individual identification information is recorded with a one-dimensional or two-dimensional barcode to be attached thereto; and a pair of reference holes that is formed in the bottom plate so as to be spaced apart from each other in a direction orthogonal to the loading direction to the drive device as seen from an axial direction of the reel, and is used for positioning the case in the loading direction and the direction orthogonal to the loading direction in a case of being loaded into the drive device, and the first half label surface or the second half label surface is inclined at one degree or more with respect to a reference plane passing through a central axis of the pair of reference holes as seen from a direction orthogonal to an axial direction of the reel and the loading direction to the drive device.

Moreover, a barcode reading system related to the present disclosure comprises the recording tape cartridge of the first aspect or the second aspect; a label that has individual identification information recorded thereon with a one-dimensional or two-dimensional barcode, and is attached to the label surface; and a barcode reading device having a light source that radiates light to the label and a light-receiving unit that receives the reflected light reflected by the label.

A barcode reading method related to the present disclosure comprises a radiation step of radiating light from a light source of a barcode reading device to a label that has individual identification information recorded thereon in a one-dimensional or two-dimensional barcode and is attached to the label surface in the recording tape cartridge of the first aspect or the second aspect; and a light-receiving step of receiving the reflected light reflected by the label by a light-receiving unit of the barcode reading device.

According to the present disclosure, it is possible to suppress that reflected light reflected by a barcode label is close to regular reflection, and the readability of barcode by the barcode reading device can be improved.

DETAILED DESCRIPTION

Hereinafter, embodiments related to the present disclosure will be described in detail with reference to the drawings. In addition, for convenience of description, in FIG. 1, a loading direction of a recording tape cartridge 10 into a drive device is indicated by an arrow A, and is referred to as a forward direction (front side) of the recording tape cartridge 10. Also, a direction of an arrow B orthogonal to the arrow A is referred to as a rightward direction (right side), and a direction of an arrow C orthogonal to the arrow A and the arrow B is referred to as an upward directions (upper side).

Figure 2:
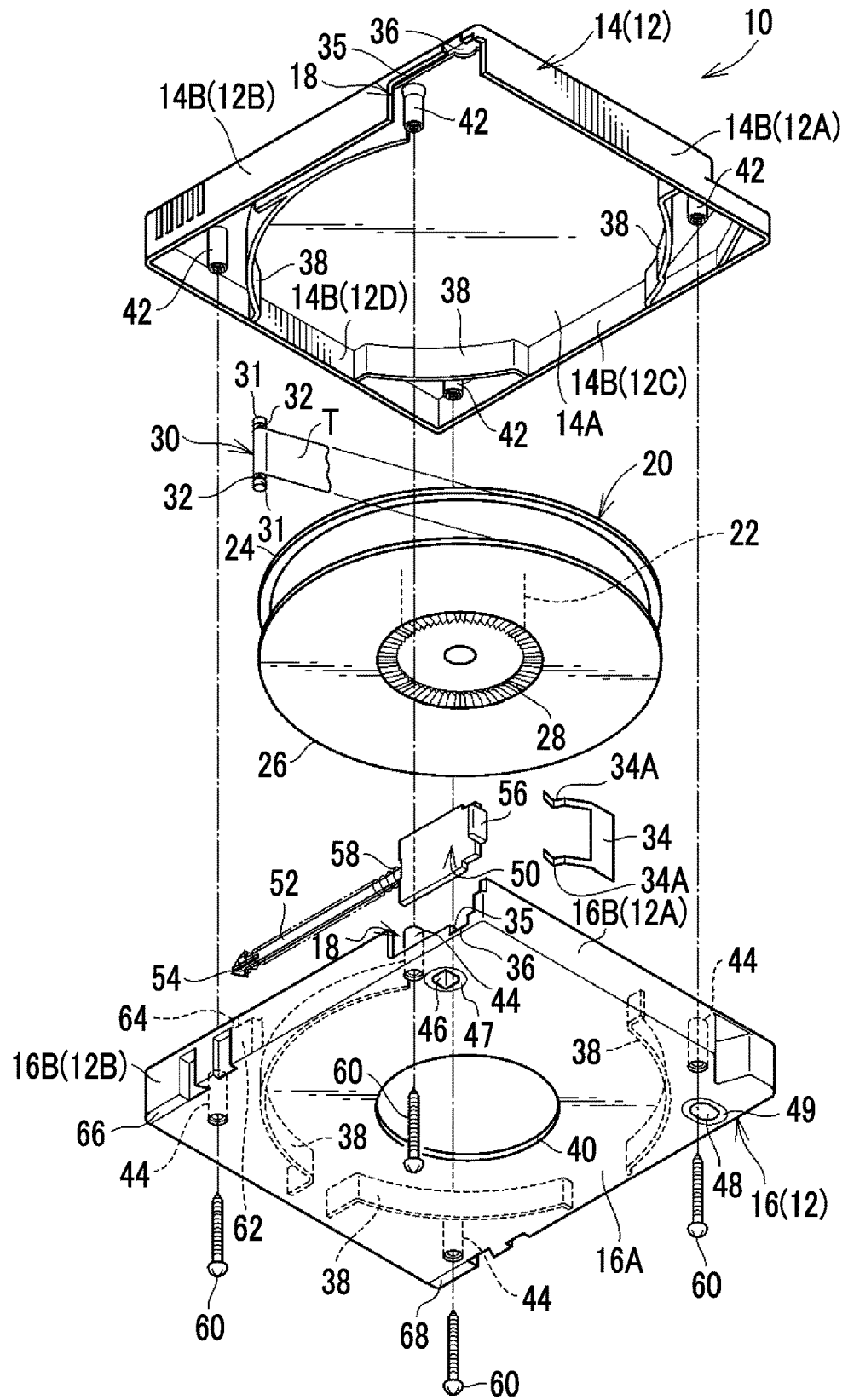
FIG. 2 is an exploded perspective view illustrating the recording tape cartridge related to the first embodiment as seen from below.

Additionally, the direction of the arrow C and a direction opposite to the direction of the arrow C are an axial direction of a reel 20 illustrated in FIG. 2, as seen from the axial direction of the reel 20, this case is referred to as a "plan view" or a "bottom view". Also, as seen from a direction orthogonal to the axial direction of the reel 20 and the loading direction (the direction of the arrow A) to the drive device, this case is referred to as a "side view".

Figure 1:
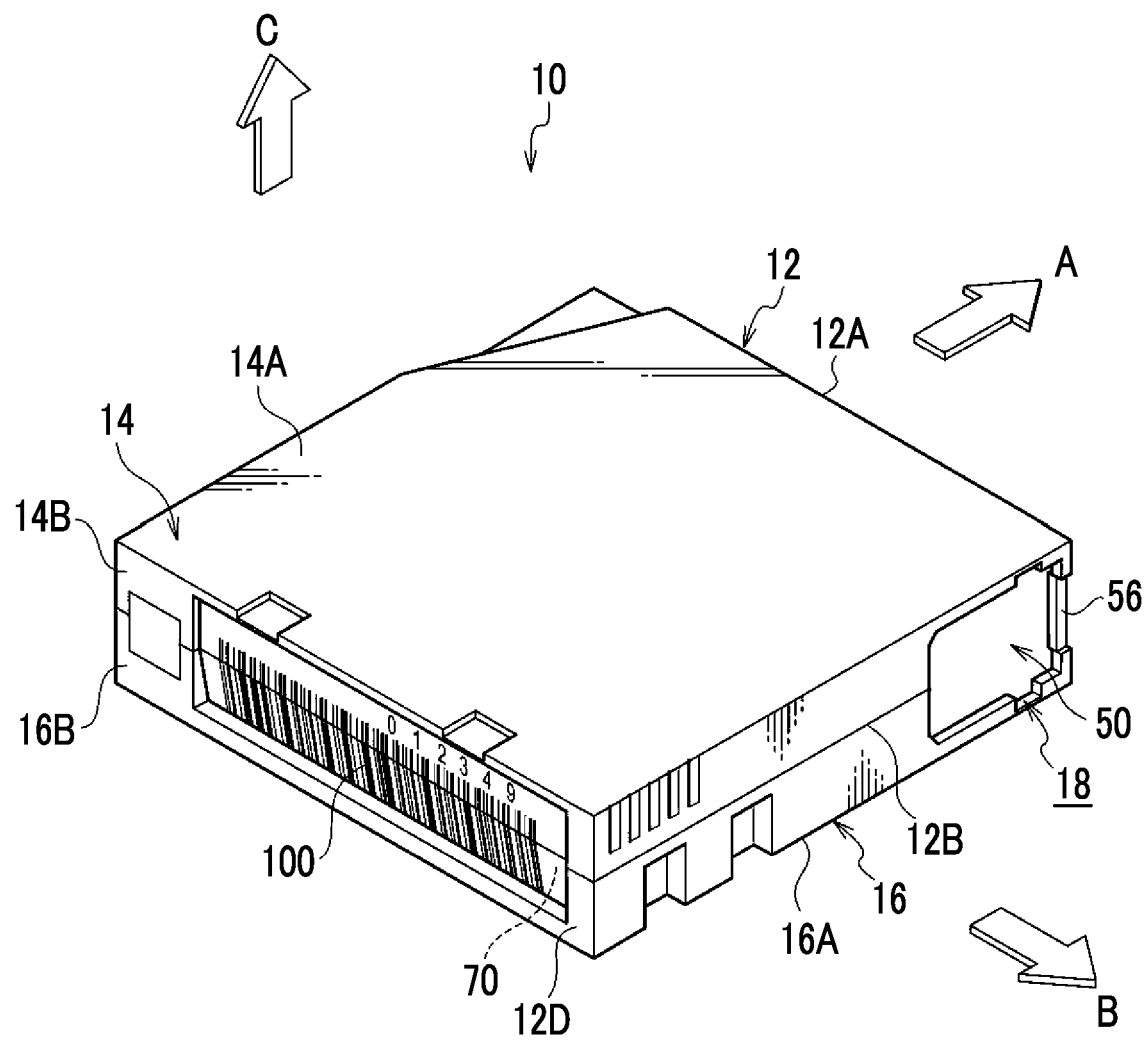
FIG. 1 is a perspective view illustrating a recording tape cartridge related to a first embodiment as seen from the rear.
Figure 3:
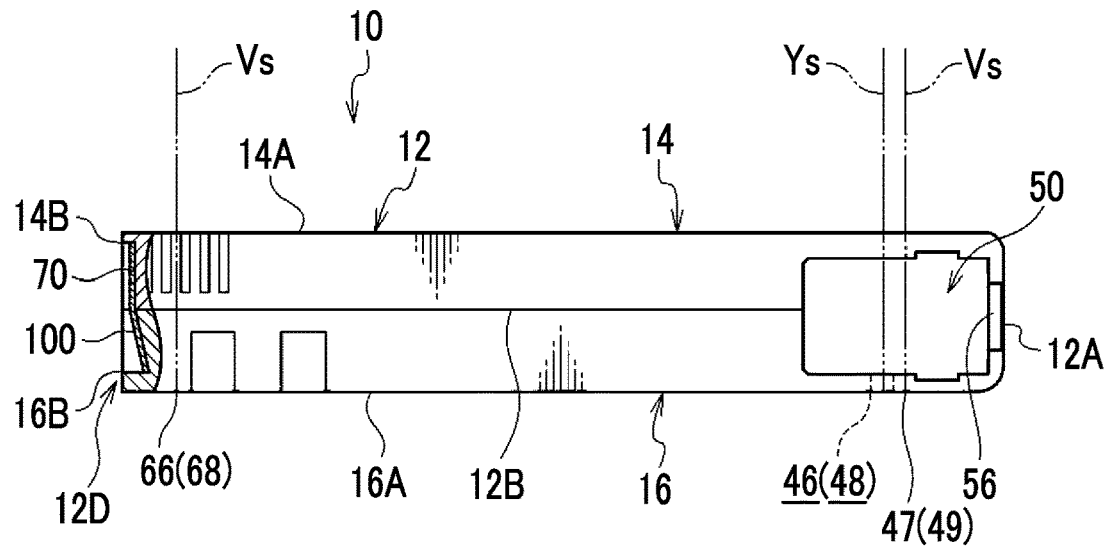
FIG. 3 is a side view illustrating the recording tape cartridge related to the first embodiment.

First, the entire configuration of the recording tape cartridge 10 will be simply described. As illustrated in FIGS. 1 to 3, the recording tape cartridge 10 has a substantially rectangular box-shaped case 12. That is, the case 12 is constituted of a first half 14 that has a substantially rectangular top plate 14A and a first peripheral wall 14B erected from a peripheral edge of the top plate 14A, and a second half 16 that has a substantially rectangular bottom plate 16A and a second peripheral wall 16B erected from a peripheral edge of the bottom plate 16A. In addition, the case 12 is made of resin, such as polycarbonate (PC).

Additionally, as illustrated in FIG. 2, in the first half 14, a plurality of (for example, four) screw bosses 42, which serve as non-through-holes and are threaded at inner peripheral surfaces thereof, are formed in the vicinity of respective corners of the first half 14. Also, in the second half 16, a plurality (for example, four) screw bosses 44 that serve as through-holes are formed at positions corresponding to the respective screw bosses 42, that is, in the vicinity of respective corners of the second half 16 in a case where the first half 14 and the second half 16 are superimposed on each other (in a case where a lower end surface of the first peripheral wall 14B and an upper end surface of the second peripheral wall 16B are butted against each other).

In a case where the case 12 is assembled, the lower end surface of the first peripheral wall 14B and the upper end surface of the second peripheral wall 16B are butted against each other. However, in this case, a lower end surface of each screw boss 42 and an upper end surface of each screw boss 44 are butted against each other. In this state, as screws 60 are inserted into the screw bosses 44 from the bottom plate 16A side and threadedly engaged with the screw bosses 42, the first half 14 and the second half 16 are joined to each other. In addition, means for joining the first half 14 and the second half 16 to each other is not limited to the screws 60, and may be joined to each other by, for example, ultrasonic welding.

Only one reel 20 made of resin is rotatably stored inside the case 12. The reel 20 is constituted of a bottomed cylindrical reel hub 22, and a disk-shaped upper flange 24 and a disk-shaped lower flange 26 that are respectively provided at both ends of the reel hub 22 in the axial direction. A recording tape T, such as a magnetic tape as an information recording and reproducing medium, is wound around an outer peripheral surface of the reel hub 22, and both ends thereof in a width direction are position-regulated by the upper flange 24 and the lower flange 26, respectively.

Additionally, as illustrated in FIGS. 1 to 3, an opening 18 for pulling out the recording tape T wound the reel 20 is formed in the right wall 12B of the case 12. Also, as illustrated in FIG. 2, a substantially columnar leader pin 30, which pulled out and operated by a pull-out member (not illustrated) of the drive device (not illustrated), is attached to a free end of recording tape T pulled out from the opening 18.

Annular grooves 32 are respectively formed on axially inner sides at both ends 31 of the leader pin 30 protruding axially outward beyond both ends of the recording tape T in the width direction, and each annular groove 32 is locked to a hook or the like of the pull-out member. Accordingly, in a case where the pull-out member pulls out the recording tape T, the hook or the like thereof comes into contact with the recording tape T so as to prevent the recording tape T from being damaged.

Additionally, a pair of upper and lower pin holding parts 36 that positions and holds the leader pin 30 within the case 12 are formed inside the opening 18 of the case 12, that is, in an inner surface of the top plate 14A of the first half 14, and the inner surface of the bottom plate 16A of the second half 16. The pin holding parts 36 has a substantially semi-circular shape in a plan view in which a pull-out side of the recording tape T is open, and the both ends 31 of the leader pin 30 in an erected state are capable of enter and leave the pin holding parts 36 from the opening side.

Additionally, a leaf spring 34 is fixedly disposed in the vicinity of the pin holding parts 36. Bifurcated distal ends 34A of the leaf spring 34 hold down the both ends 31 of the leader pin 30, respectively, so as to hold the leader pin 30 in the pin holding parts 36. In addition, in a case where the leader pin 30 enters and leaves the pin holding parts 36, the distal ends 34A of the leaf spring 34 are appropriately elastically deformed so as to allow movement of the leader pin 30.

Additionally, a gear opening 40 for exposing a reel gear 28 of the reel 20 to the outside is formed at a central part of the second half 16 (bottom plate 16A). The reel 20 is rotationally driven within the case 12 as the reel gear 28 meshes with a drive gear (not illustrated) of the drive device. Additionally, the reel 20 is provided on inner surfaces of the first half 14 and the second half 16, respectively, so as to partially protrude therefrom, and is position-regulated so as not to rattle by a play regulating wall 38 on a circular track coaxial with the gear opening 40.

Additionally, as illustrated in FIGS. 1 to 3, the opening 18 is opened and closed by a door 50. The door 50 is formed in a rectangular plate shape of a size such that the opening 18 can be blocked, and grooves 35, which allow of upper and lower ends of the door 50 to slidably fit thereinto, are formed in the inner surface of the top plate 14A and the inner surface of the bottom plate 16A inside the opening 18 so as to movable along the right wall 12B of the case 12.

Additionally, a shaft 52 is provided at the center of a rear end of the door 50 so as to protrude therefrom, and a coil spring 58 is fitted on the shaft 52. Also, an expanding part 54, which prevents the coil spring 58 from slipping out of the shaft 52, is formed at a rear end of the shaft 52. Additionally, a supporting base 62, which has a locking projection 64 to which a rear end of the coil spring 58 is fitted on the shaft 52 is locked, is provided in the second half 16 so as to protrude therefrom.

Hence, the door 50 is always biased due to the biasing force of the coil spring 58 in a blocking direction of the opening 18 as the shaft 52 is slidably supported on the supporting base 62, and the rear end of the coil spring 58 is locked to the locking projection 64. In addition, it is preferable that a supporting base (not illustrated) that supports the shaft 52 during the opening of the opening 18 is further provided on a rear side of the supporting base 62 so as to protrude therefrom.

Additionally, a protrusion 56 for opening and closing operation is provided at a front end of the door 50 so as to protrude toward the outside (right). The protrusion 56 is engaged with an opening and closing member (not illustrated) of the drive device with the loading of the recording tape cartridge 10 from a front wall 12A side to the drive device. Accordingly, the door 50 is opened against the biasing force of the coil spring 58.

Additionally, as illustrated in FIG. 2, in the bottom plate 16A of the second half 16 a pair of reference holes 46 and 48 serving as non-through-holes are spaced apart in a leftward-rightward direction and are formed at the same position in a forward-backward direction. The reference hole 46 on the right wall 12B side is formed in a substantially square shape in a bottom view, and the reference hole 48 on the left wall 12C side is formed in a substantially elliptical shape that is long in the leftward-rightward direction in the bottom view.

Then, in a case where the recording tape cartridge 10 is loaded into the drive device, a positioning member (not illustrated) provided in the drive device is inserted into each of the reference hole 46 and the reference hole 48. Accordingly, the forward-backward direction and leftward-rightward direction of the recording tape cartridge 10 (case 12) are positioned within the drive device.

Additionally, a circular reference surface 47 and an elliptical reference surface 49 that are mirror-finished are respectively formed around the reference hole 46 and the reference hole 48 in the bottom plate 16A. Also, a reference surface 66 and a reference surface 68 having a rectangular shape (an oblong shape in which the forward-backward direction is the longitudinal direction), which is mirror-finished, are respectively formed at rear end corners in the bottom plate 16A. In addition, the respective reference surfaces 47, 49, 66, and 68 are on the same plane.

In a case where the recording tape cartridge 10 is loaded into the drive device, positioning surfaces (not illustrated) provided in the drive device abut against the reference surface 47 and the reference surface 49, the reference surface 66, and the reference surface 68, respectively. Accordingly, a thickness direction (height direction) of the recording tape cartridge 10 (case 12) is positioned within the drive device.

In the recording tape cartridge 10 configured as above, next, structures (shapes) of a label surface 70 (refer to FIG. 1 and FIGS. 3 to 6) related to the first embodiment formed in a rear wall 12D of the case 12, a label surface 71 (refer to FIGS. 8 to 10) related to the second embodiment, a label surface 80 (refer to FIG. 11 and FIG. 12) related to a third embodiment, and a label surface 81 (refer to FIG. 13 and FIG. 14) related to a fourth embodiment will be described in detail.

First Embodiment

Figure 4:
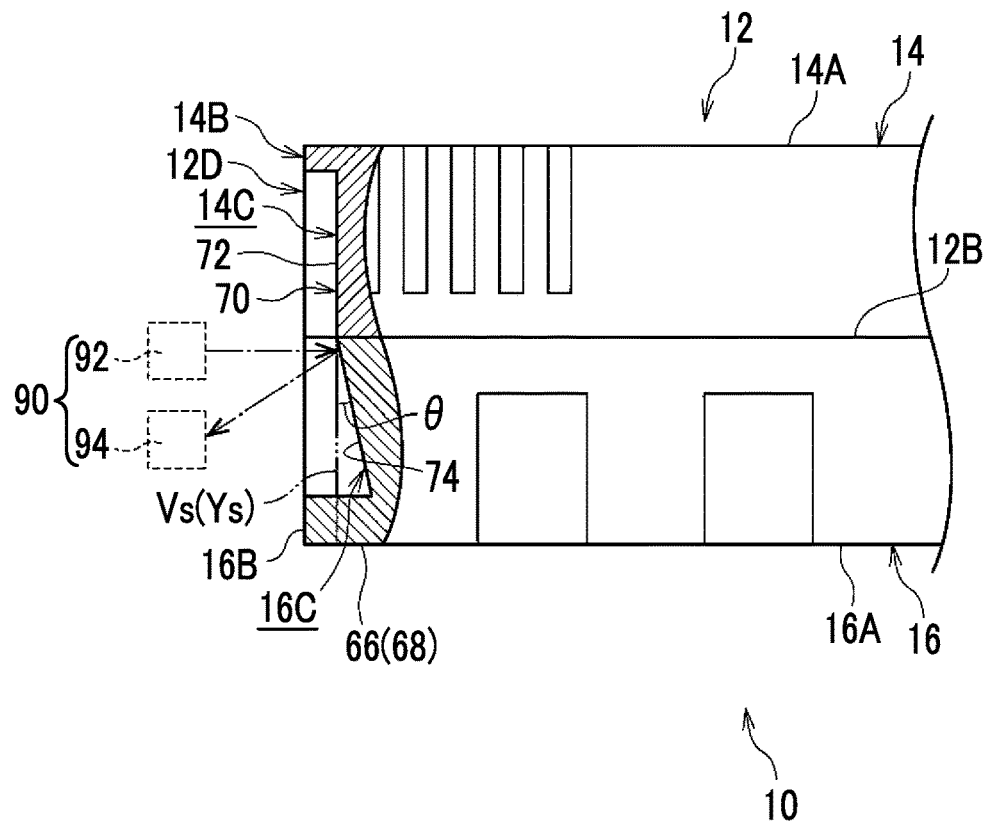
FIG. 4 is an enlarged side cross-sectional view illustrating a label surface of the recording tape cartridge related to the first embodiment.

First, the label surface 70 related to the first embodiment will be described. As illustrated in FIG. 1, FIG. 3, and FIG. 4, the substantially oblong (same shape) label surface 70, to which a substantially oblong barcode label 100 in which the leftward-rightward direction is the longitudinal direction is attached, is formed on the rear wall 12D of the case 12. The barcode label 100 is a label in which individual identification information of each recording tape cartridge 10 is recorded with a one-dimensional barcode, and the thickness thereof is, for example, 0.2 mm.

The label surface 70 is constituted of a first half label surface 72 formed at an upper part (first peripheral wall 14B) of the rear wall 12D of the case 12, and a second half label surface 74 formed at a lower part (second peripheral wall 16B) of the rear wall 12D of the case 12. The first half label surface 72 is constituted of a bottom surface of a substantially oblong first recess 14C formed in the first peripheral wall 14B, and the second half label surface 74 is constituted of a bottom surface of a substantially oblong second recess 16C formed in the second peripheral wall 16B.

Also, only the second half label surface 74 is inclined at an inclination angle θ (refer to FIG. 4) of one degree or more with respect to a vertical plane Vs (illustrated by a phantom line in FIG. 3) that is perpendicular to the reference surfaces 47, 49, 66, and 68 in the side view and has a normal direction as the forward-backward direction or a reference plane Ys (illustrated by a phantom line illustrated in FIG. 3) passing through a central axis of the pair of reference holes 46 and 48. Specifically, the second half label surface 74 is a flat inclined surface (planar surface) that is inclined to the front (the loading direction to the drive device) toward the bottom plate 16A in the side view. In addition, illustration of the barcode label 100 is omitted in FIG. 4.

Here, the reason why the inclination angle θ of the second half label surface 74 is one degree or more, is that occurrence of halation HL to be described below cannot be prevented at a draft angle from the die in the second peripheral wall 16B of the second half 16 in a case where the second half 16 is molded by a die (not illustrated). That is, the draft angle is a minimum angle that is less than one degree with respect to the vertical plane Vs or the reference plane Ys, and the above one degree does not cause the halation HL.

Additionally, an upper limit of the inclination angle θ of the second half label surface 74 may be an angle at which the reflected light, which is radiated from a light source 92 (illustrated by a phantom line FIG. 4) of a barcode reading device 90 to be described below to the barcode label 100 and reflected by the barcode label 100, is capable of being received by a light-receiving unit 94 (illustrated by a phantom line in FIG. 4), and is not specifically determined.

In the label surface 70 related to the first embodiment configured as above, next, the operation (including a barcode reading method) thereof will be described.

Figure 5:
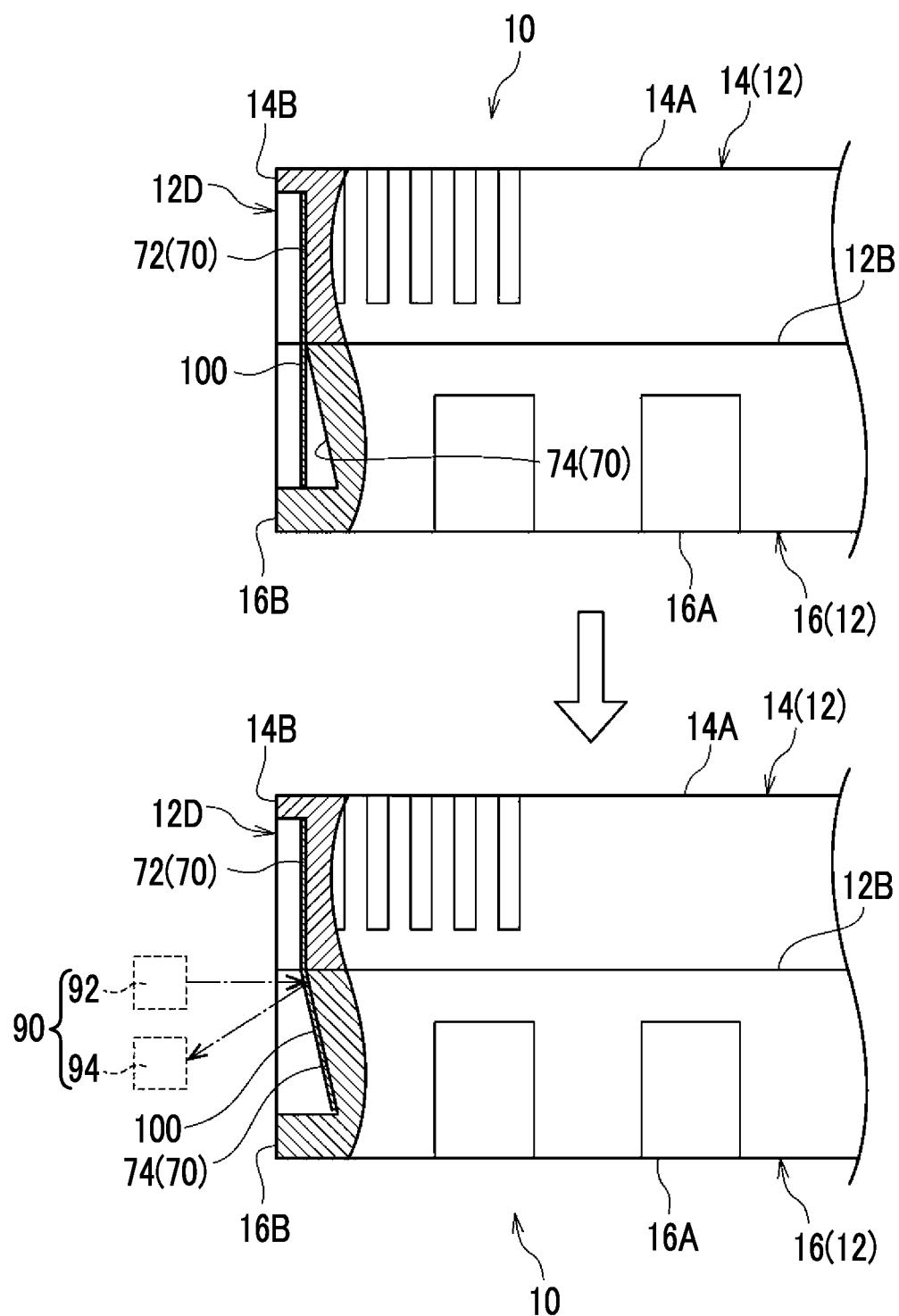
FIG. 5 is a side cross-sectional view a mode in which a barcode label is attached to the label surface of the recording tape cartridge related to the first embodiment.
Figure 6:
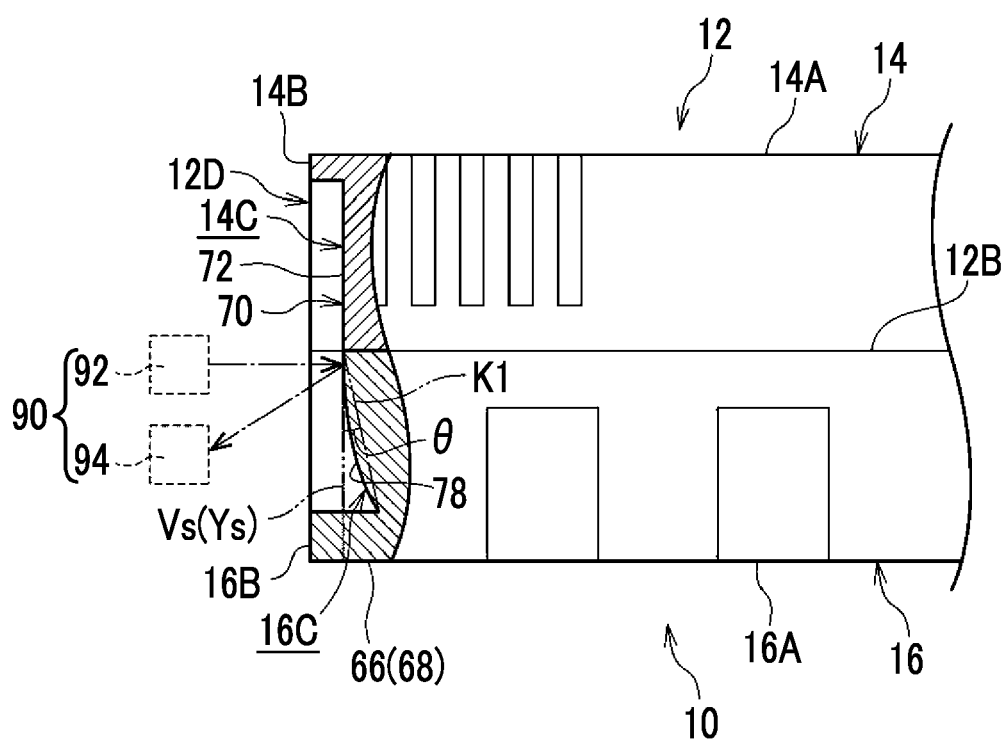
FIG. 6 is an enlarged side cross-sectional view illustrating a modification example of the label surface of the recording tape cartridge related to the first embodiment.

As illustrated in FIG. 5, in a case where the barcode label 100 is attached to the label surface 70 in which a lower half is inclined, first, an upper half of the barcode label 100 is attached to the first half label surface 72. Here, the first half label surface 72 is parallel to the vertical plane Vs (refer to FIG. 3) or the reference plane Ys (refer to FIG. 3). Hence, the barcode label 100 can be simply (accurately) attached in a state where the barcode label is attached to the first half label surface 72.

Next, a lower half of the barcode label 100 is attached to the second half label surface 74. Here, since the upper half of the barcode label 100 is already attached to the first half label surface 72, in a case where the barcode label 100 is attached to the second half label surface 74, the barcode label can be simply attached by applying a force (along the second half label surface 74) from a substantially central part thereof in the height direction to a lower end thereof.

Hence, the productivity of the recording tape cartridge 10 to which the barcode label 100 is attached can be improved compared to a comparative example to be described below. Additionally, since air does not easily enter between the second half label surface 74 and the barcode label 100, generation of wrinkles in the barcode label 100 after being attached to the label surface 70 can be suppressed or prevented.

That is, occurrence of poor reading in the barcode reading device 90 resulting from wrinkles being present in the barcode label 100 can be suppressed or prevented, and reading performance (readability) for the barcode can be improved. In addition, it is preferable that the barcode label 100 is attached to the label surface 70 such that the barcode straddles both the first half label surface 72 and the second half label surface 74.

The recording tape cartridge 10 to which the barcode label 100 is attached to the label surface 70 is stored in a library (not illustrated). In a case where the recording tape cartridge 10 stored in the library is loaded into the drive device, a rear part of the recording tape cartridge 10 is gripped by a robot hand (not illustrated). Then, the barcode of the barcode label 100 attached to the label surface 70 of the rear wall 12D is read by the barcode reading device 90 (refer to FIG. 4 and FIG. 5) provided at the robot hand.

That is, light is radiated from the light source 92 of the barcode reading device 90 to a barcode label 100 (radiation step), and the reflected light reflected by the barcode label 100 is received by the light-receiving unit 94 of the barcode reading device 90 (light-receiving step). In addition, in the barcode reading device 90 in this case, the light source 92 is disposed at a substantially central part of the robot hand in an upward and downward (height) direction, and the light-receiving unit 94 is disposed below the light source 92. Additionally, a barcode reading system is constituted of this barcode reading device 90, the recording tape cartridge 10, and the barcode label 100.

Figure 15:
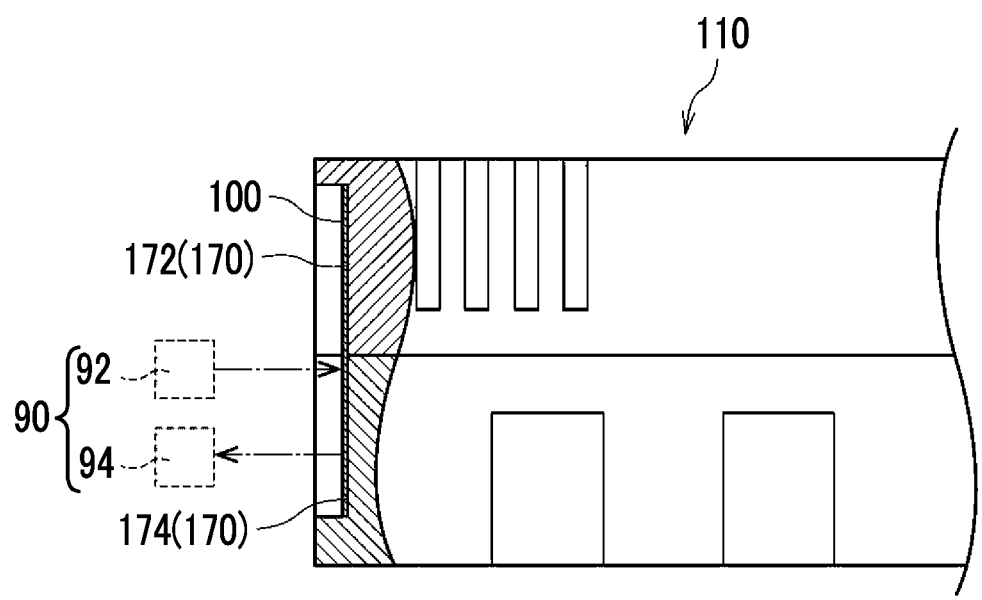
FIG. 15 is an enlarged side cross-sectional view illustrating a label surface of a recording tape cartridge related to a comparative example.

As illustrated in FIG. 15, in the recording tape cartridge 110 related to the comparative example, the label surface 170 (the first half label surface 172 and the second half label surface 174) is parallel to the vertical plane Vs (refer to FIG. 3) that is perpendicular to the reference surfaces 47, 49, 66, and 68 and has the normal direction as the forward-backward direction or the reference plane Ys (refer to FIG. 3) passing through the central axis of or the pair of reference holes 46 and 48.

Hence, if light is radiated from the light source 92 to the barcode label 100 in order to read the barcode of the barcode label 100 attached to the label surface 170 by the barcode reading device 90, there is a case where the light is reflected in a state close to regular reflection. That is, there is a case where the reflected light received by the light-receiving unit 94 is close to the regular reflection.

Figure 16:
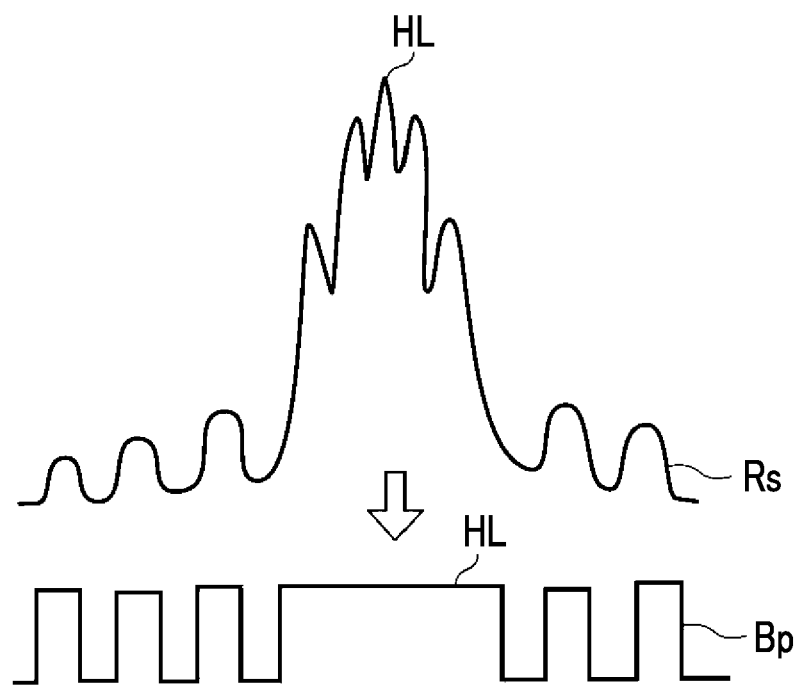
FIG. 16 is an explanatory view illustrating received signals resulting from reflected light from a barcode label attached to the label surface of the recording tape cartridge related to the comparative example and a barcode pattern resulting from the barcode signals.

In this case, as illustrated in FIG. 16, the halation HL is caused, and bars (black portions) and spaces (black portions) of the barcode cannot be distinguished from each other, causing poor reading, and (an upper side of FIG. 16 illustrates received signals Rs in the light-receiving unit 94, and a lower side of FIG. 16 illustrates a barcode pattern Bp based on the received signals.).

In contrast, in the recording tape cartridge 10 related to the first embodiment, as illustrated in FIG. 4 and FIG. 5, a lower half of the barcode of the barcode label 100 are attached to the second half label surface 74 that constitutes the label surface 70. Therefore, the lower half is inclined at the inclination angle θ (refer to FIG. 4) with respect to the vertical plane Vs or the reference plane Ys in the side view.

Hence, even in a case where light is radiated from the light source 92 to the barcode label 100 in order to read the barcode of the barcode label 100 attached to the label surface 70 by the barcode reading device 90, reflection of the light in the state close to the regular reflection in the barcode label 100 can be suppressed and prevented.

Figure 7:
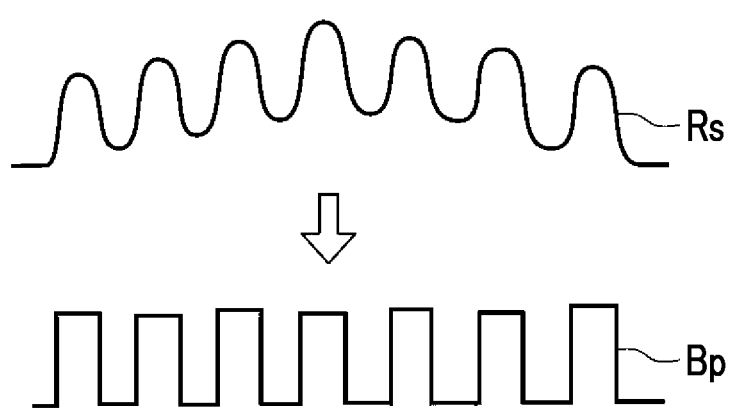
FIG. 7 is an explanatory view illustrating received signals resulting from reflected light from the barcode label attached to the label surface of the recording tape cartridge related to the first embodiment and a barcode pattern resulting from the barcode signals.

That is, the reflected light to be received by the light-receiving unit 94 being close to the regular reflection can be suppressed and prevented, and as illustrated in FIG. 7, the reflected light can be appropriately (in a state the bars and the spaces of the barcode are distinguished from each other) received by the light-receiving unit 94 (an upper side of FIG. 7 illustrates the received signals Rs in the light-receiving unit 94, and the lower side of FIG. 7 illustrates the barcode pattern Bp based on the received signals.). Hence, occurrence of poor reading in the barcode reading device 90 can be suppressed or prevented, and the reading performance (readability) for the barcode can be improved.

In addition, the second half label surface 74 illustrated in FIG. 4 and FIG. 5 is a planar surface (flat surface). However, as in a modification example illustrated in FIG. 6, the second half label surface 74 may be a second half label surface 78 formed as a curved surface (convex surface) that protrudes toward the outside (obliquely rearward and downward) in the side view. Even in the case of the second half label surface 78 formed as the curved surface, the same effects as the above are obtained.

The inclination angle θ with respect to the vertical plane Vs or the reference plane Ys in the second half label surface 78 is an angle between a longest chord (illustrated by a phantom line K1 that connects an upper end and a lower end of the second half label surface 78) in the curved surface to each other. Additionally, the second half label surface 78 is not limited to the curved surface of the convex surface, and may be a curved surface of a concave surface.

Second Embodiment

Next, the label surface 71 related to the second embodiment will be described. In addition, the same parts as those of the above first embodiment will be designated by the same reference signs, and the detailed description (also including common functions) thereof will be appropriately omitted.

Figure 8:
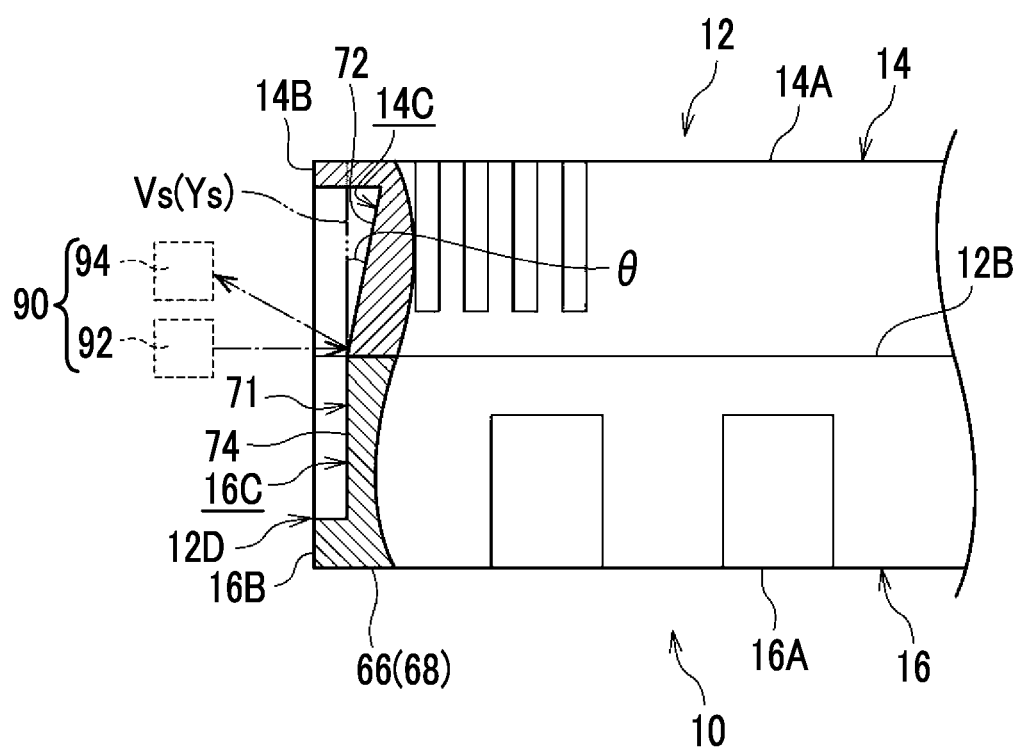
FIG. 8 is an enlarged side cross-sectional view illustrating a label surface of a recording tape cartridge related to a second embodiment.

As illustrated in FIG. 8, in the label surface 71, only the first half label surface 72, not the second half label surface 74, is inclined at the inclination angle θ of one degree or more with respect to the vertical plane Vs (refer to FIG. 3) or the reference plane Ys (refer to FIG. 3) in the side view. Specifically, the first half label surface 72 is a flat inclined surface (planar surface) that is inclined to the front (the loading direction to the drive device) toward the top plate 14A in the side view. In addition, illustration of the barcode label 100 is omitted in FIG. 8.

Here, the reason why the inclination angle θ of the first half label surface 72 is one degree or more, similarly to the above first embodiment, is that the occurrence of the above-described halation HL (refer to FIG. 16) cannot be prevented at a draft angle from the die in the first peripheral wall 14B of the first half 14 in a case where the first half 14 is molded by the die (not illustrated).

Additionally, an upper limit of the inclination angle θ of the first half label surface 72, similarly to the first embodiment, may be an angle at which the reflected light, which is radiated from the light source 92 (illustrated by a phantom line FIG. 8) of the barcode reading device 90 to the barcode label 100 and reflected by the barcode label 100, is capable of being received by the light-receiving unit 94 (illustrated by a phantom line in FIG. 8), and is not specifically determined.

In the label surface 71 related to the second embodiment configured as above, next, the operation (including a barcode reading method) thereof will be described.

Figure 9:
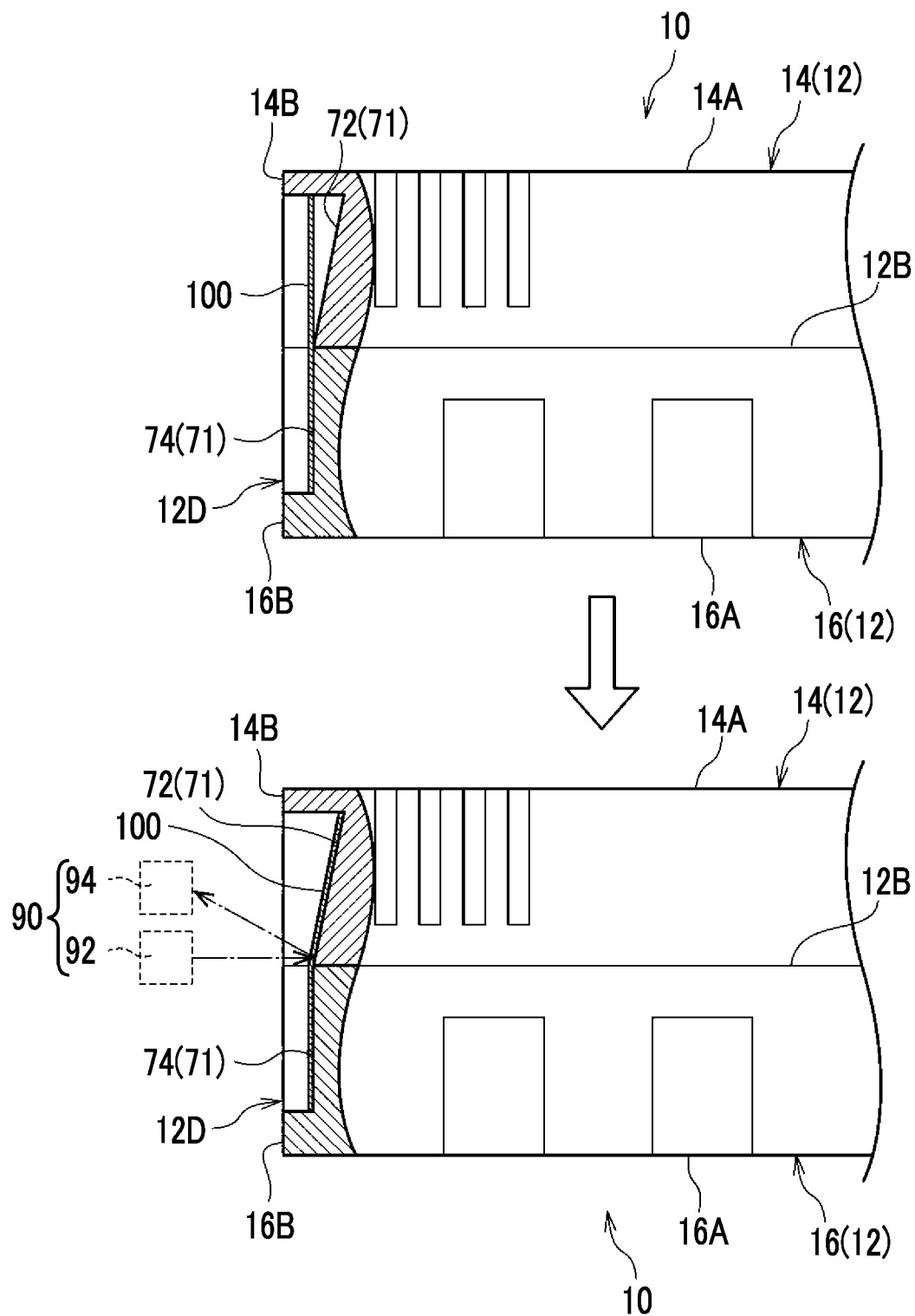
FIG. 9 is a side cross-sectional view illustrating a mode in which a barcode label is attached to the label surface of the recording tape cartridge related to the second embodiment.
Figure 10:
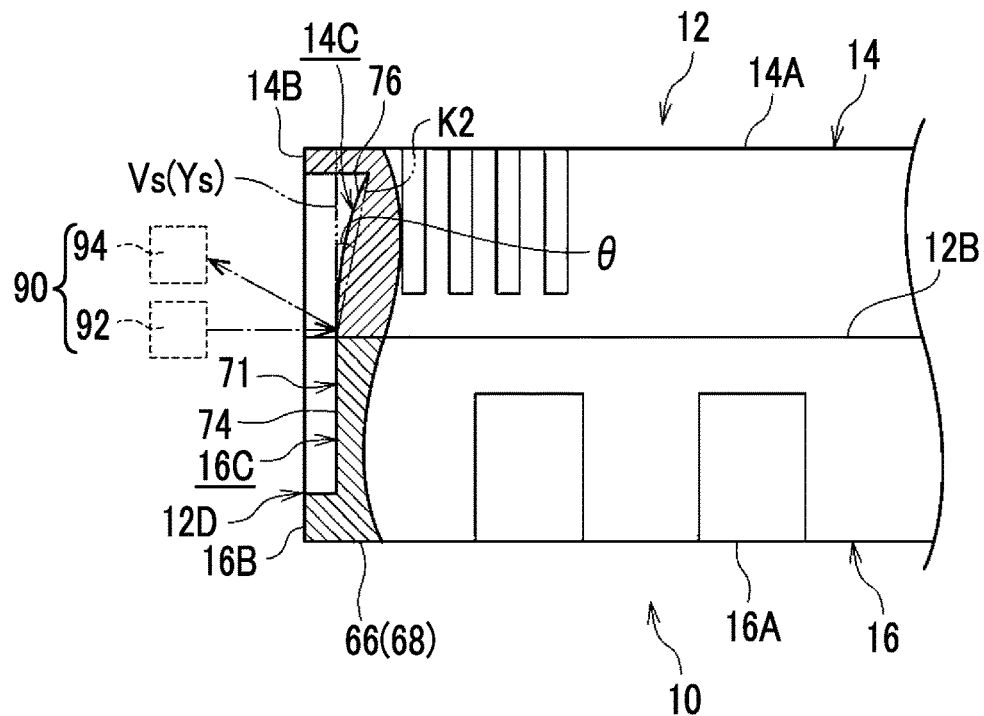
FIG. 10 is an enlarged side cross-sectional view illustrating a modification example of the label surface of the recording tape cartridge related to the second embodiment.

As illustrated in FIG. 9, in a case where the barcode label 100 is attached to the label surface 71 in which an upper half is inclined, first, the lower half of the barcode label 100 is attached to the second half label surface 74. Here, the second half label surface 74 is parallel to the vertical plane Vs (refer to FIG. 3.) or the reference plane Ys (refer to FIG. 3.). Hence, the barcode label 100 can be simply (accurately) attached in a state where the barcode label is attached to the second half label surface 74.

Next, the upper half of the barcode label 100 is attached to the first half label surface 72. Here, since the lower half of the barcode label 100 is already attached to the second half label surface 74, in a case where the barcode label 100 is attached to the first half label surface 72, the barcode label can be simply attached by applying a force (along the first half label surface 72) from the substantially central part thereof in the height direction to the lower end thereof.

Hence, the productivity of the recording tape cartridge 10 to which the barcode label 100 is attached can be improved compared to the above comparative example. Additionally, since air does not easily enter between the first half label surface 72 and the barcode label 100, generation of wrinkles in the barcode label 100 after being attached to the label surface 71 can be suppressed or prevented.

That is, occurrence of poor reading in the barcode reading device 90 resulting from wrinkles being present in the barcode label 100 can be suppressed or prevented, and reading performance (readability) for the barcode can be improved. In addition, it is preferable that the barcode label 100 is attached to the label surface 71 such that the barcode straddles both the first half label surface 72 and the second half label surface 74.

The recording tape cartridge 10 to which the barcode label 100 is attached to the label surface 71 is stored in the library. In a case where the recording tape cartridge 10 stored in the library is loaded into the drive device, the rear part of the recording tape cartridge 10 is gripped by the robot hand. Then, the barcode of the barcode label 100 attached to the label surface 71 of the rear wall 12D is read by the barcode reading device 90 (refer to FIG. 8 and FIG. 9) provided at the robot hand.

That is, light is radiated from the light source 92 of the barcode reading device 90 to a barcode label 100 (radiation step), and the reflected light reflected by the barcode label 100 is received by the light-receiving unit 94 of the barcode reading device 90 (light-receiving step). In addition, in the barcode reading device 90 in this case, the light-receiving unit 94 is disposed above the light source 92 as the robot hand in the above first embodiment rotates 180 degrees.

Here, in the recording tape cartridge 10 related to the second embodiment, as illustrated in FIG. 8 and FIG. 9, an upper half of the barcode of the barcode label 100 is attached to the first half label surface 72 that constitutes the label surface 71. Therefore, the upper half is inclined at the inclination angle θ (refer to FIG. 8) with respect to the vertical plane Vs or the reference plane Ys in the side view.

Hence, even in a case where light is radiated from the light source 92 to the barcode label 100 in order to read the barcode of the barcode label 100 attached to the label surface 71 by the barcode reading device 90, reflection of the light in the state close to the regular reflection in the barcode label 100 can be suppressed and prevented.

That is, the reflected light to be received by the light-receiving unit 94 being close to the regular reflection can be suppressed and prevented, and as illustrated in FIG. 7, the reflected light can be appropriately (in a state the bars and the spaces of the barcode are distinguished from each other) received by the light-receiving unit 94. Hence, occurrence of poor reading in the barcode reading device 90 can be suppressed or prevented, and the reading performance (readability) for the barcode can be improved.

In addition, the first half label surface 72 illustrated in FIG. 8 and FIG. 9 is a planar surface (flat surface). However, as in a modification example illustrated in FIG. 10, the first half label surface 72 may be the first half label surface 76 formed as a curved surface (convex surface) that protrudes toward the outside (obliquely rearward and upward) in the side view. Even in the case of the first half label surface 76 formed as the curved surface, the same effects as the above are obtained.

The inclination angle θ with respect to the vertical plane Vs or the reference plane Ys in the first half label surface 76 is an angle between a longest chord (illustrated by a phantom line K2 that connects the upper end and the lower end of the first half label surface 76) in the curved surface to each other. Additionally, the first half label surface 76 is not limited to the curved surface of the convex surface, and may be a curved surface of a concave surface.

Third Embodiment

Next, the label surface 80 related to the third embodiment will be described. In addition, the same parts as those of the above first and second embodiments will be designated by the same reference signs, and the detailed description (also including common functions) thereof will be appropriately omitted.

Figure 11:
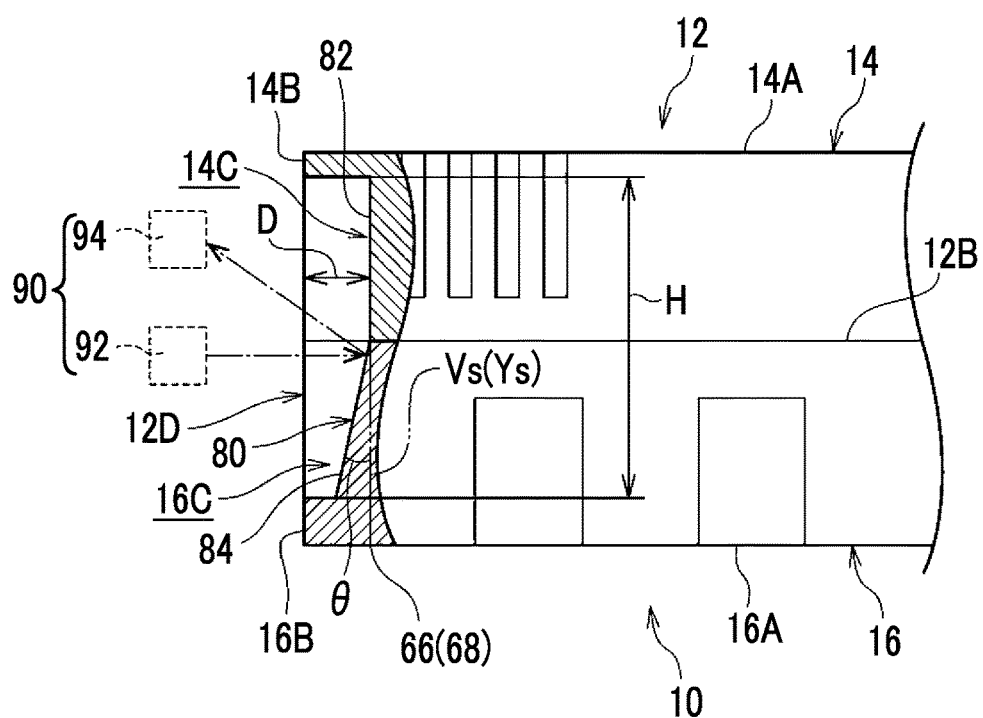
FIG. 11 is an enlarged side cross-sectional view illustrating a label surface of a recording tape cartridge related to a third embodiment.
Figure 12:
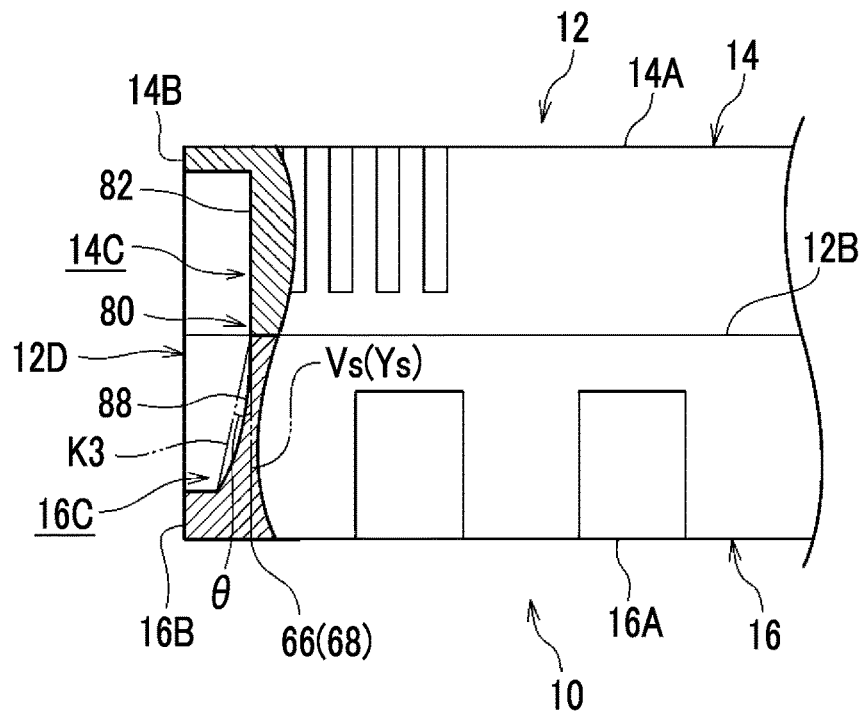
FIG. 12 is an enlarged side cross-sectional view illustrating a modification example of the label surface of the recording tape cartridge related to the third embodiment.

As illustrated in FIG. 11, the label surface 80 is constituted of a first half label surface 82 formed at the upper part (first peripheral wall 14B) of the rear wall 12D of the case 12, and a second half label surface 84 formed at the lower part (second peripheral wall 16B) of the rear wall 12D of the case 12. The first half label surface 82 is constituted of the bottom surface of the substantially oblong first recess 14C formed in the first peripheral wall 14B, and the second half label surface 84 is constituted of the bottom surface of the substantially oblong second recess 16C formed in the second peripheral wall 16B.

Also, only the second half label surface 84 is inclined at an inclination angle θ of one degree or more and 3.2 or less with respect to the vertical plane Vs (refer to FIG. 3) that is perpendicular to the reference surfaces 47, 49, 66, and 68 in the side view and has the normal direction as the forward-backward direction or the reference plane Ys (refer to FIG. 3) passing through the central axis of the pair of reference holes 46 and 48. Specifically, the second half label surface 84 is a flat inclined surface (planar surface) that is inclined to the rear (a direction opposite to the loading direction to the drive device) toward the bottom plate 16A in the side view. In addition, illustration of the barcode label 100 is omitted in FIG. 11.

Here, the reason why the inclination angle θ of the second half label surface 84 is one degree or more, similarly to the above first embodiment, is that the occurrence of the above-described halation HL (refer to FIG. 16) cannot be prevented at a draft angle from the die in the second peripheral wall 16B of the second half 16 in a case where the second half 16 is molded by the die (not illustrated). That is, the draft angle is a minimum angle that is less than one degree with respect to the vertical plane Vs or the reference plane Ys, and the above one degree does not cause the halation HL.

On the other hand, the reason why the inclination angle θ of the second half label surface 84 is set to 3.2 degrees or less is that the lower part of the barcode label 100 attached to the label surface 80 protrudes rearward from a second recess 16C to such a degree that the lower part is visually recognized in the side view if the inclination angle θ of the second half label surface 84 is made larger than 3.2 degrees.

To make a description specifically taking numerical values, according to JISX6175, a depth D of the label surface 80 (the first recess 14C and the second recess 16C) is 0.20 mm to 0.50 mm (the depth D is exaggerated and drawn in FIG. 11). A height H (a combination height of the first recess 14C and the second recess 16C) of the label surface 80 is 17.40 mm to 17.60 mm.

Hence, in order not to make the lower part of the barcode label 100 protrude rearward from the second recess 16C in the side view, for example in the case of the depth of D=0.50 mm and the height of H=17.40 mm, $\tan\theta \leq 0.5/(17.40/2) \approx 0.05747$ is established, and $\theta \leq 3.289$ is derived. Hence, even in a case where the barcode label 100 with a thickness of 0.2 mm is attached to the label surface 80, the inclination angle θ of the second half label surface 84 is set to 3.2 degrees or less, considering that the lower part of the barcode label 100 does not protruding from the second recess 16C to such a degree that the lower part is visually recognized.

In the label surface 80 related to the third embodiment configured as above, next, the operation (including a barcode reading method) thereof will be described. In addition, since the steps and operation of attaching the barcode label 100 to the label surface 80 are the same as those of the above first embodiment, the description thereof is omitted.

The recording tape cartridge 10 to which the barcode label 100 is attached to the label surface 80 is stored in the library. In a case where the recording tape cartridge 10 stored in the library is loaded into the drive device, the rear part of the recording tape cartridge 10 is gripped by the robot hand. Then, the barcode of the barcode label 100 attached to the label surface 80 of the rear wall 12D is read by the barcode reading device 90 (refer to FIG. 11) provided at the robot hand.

That is, light is radiated from the light source 92 of the barcode reading device 90 to a barcode label 100 (radiation step), and the reflected light reflected by the barcode label 100 is received by the light-receiving unit 94 of the barcode reading device 90 (light-receiving step). In addition, in the barcode reading device 90 in this case, the light-receiving unit 94 is disposed above the light source 92.

Here, in the recording tape cartridge 10 related to the third embodiment, the lower half of the barcode of the barcode label 100 is attached to the second half label surface 84 that constitutes the label surface 80. Therefore, these lower halves are inclined at the inclination angle θ (refer to FIG. 11) with respect to the vertical plane Vs or the reference plane Ys in the side view.

Hence, even in a case where light is radiated from the light source 92 to the barcode label 100 in order to read the barcode of the barcode label 100 attached to the label surface 80 by the barcode reading device 90, reflection of the light in the state close to the regular reflection in the barcode label 100 can be suppressed and prevented.

That is, the reflected light to be received by the light-receiving unit 94 being close to the regular reflection can be suppressed and prevented, and the reflected light can be appropriately (in a state the bars and the spaces of the barcode are distinguished from each other) received by the light-receiving unit 94. Hence, occurrence of poor reading in the barcode reading device 90 can be suppressed or prevented, and the reading performance (readability) for the barcode can be improved.

In addition, the second half label surface 84 illustrated in FIG. 11 is a planar surface (flat surface). However, as in a modification example illustrated in FIG. 12, the second half label surface 84 may be a second half label surface 88 formed as a curved surface (concave surface) that protrudes toward the inside (obliquely forward and downward) in the side view. Even in the case of the second half label surface 88 formed as the curved surface, the same effects as the above are obtained.

The inclination angle θ with respect to the vertical plane Vs or the reference plane Ys in the second half label surface 88 is an angle between a longest chord (illustrated by a phantom line K3 that connects an upper end and a lower end of the second half label surface 88) in the curved surface to each other. Additionally, the second half label surface 88 is not limited to the curved surface of a concave surface, and may be made into the curved surface of a convex surface.

Fourth Embodiment

Finally, the label surface 81 related to the fourth embodiment will be described. In addition, the same parts as those of the above first to third embodiments will be designated by the same reference signs, and the detailed description (also including common functions) thereof will be appropriately omitted.

Figure 13:
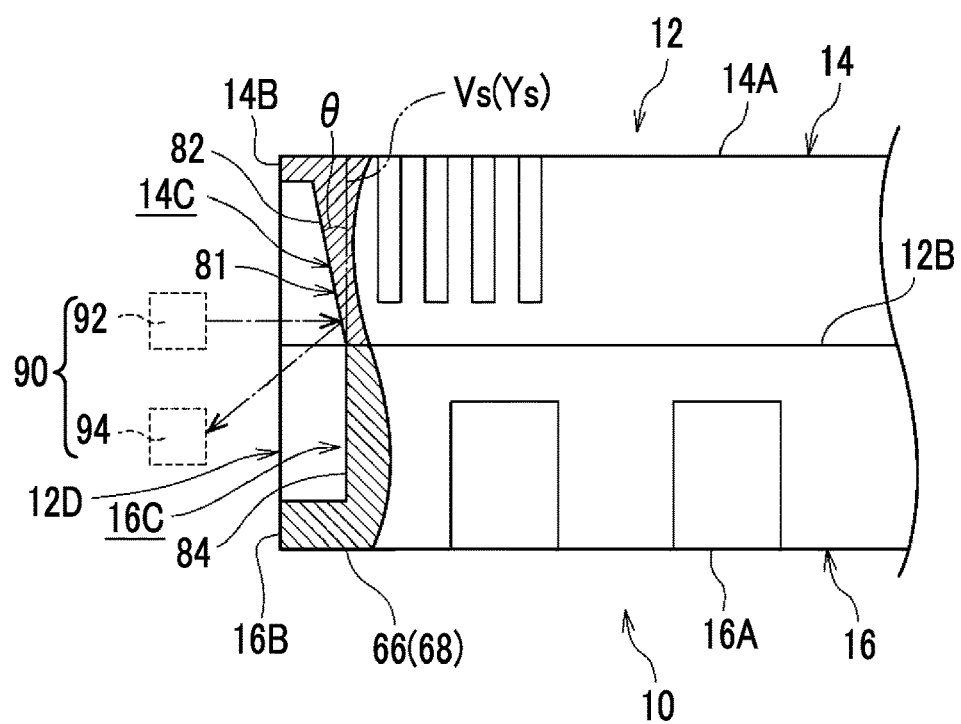
FIG. 13 is an enlarged side cross-sectional view illustrating a label surface of a recording tape cartridge related to a fourth embodiment.
Figure 14:
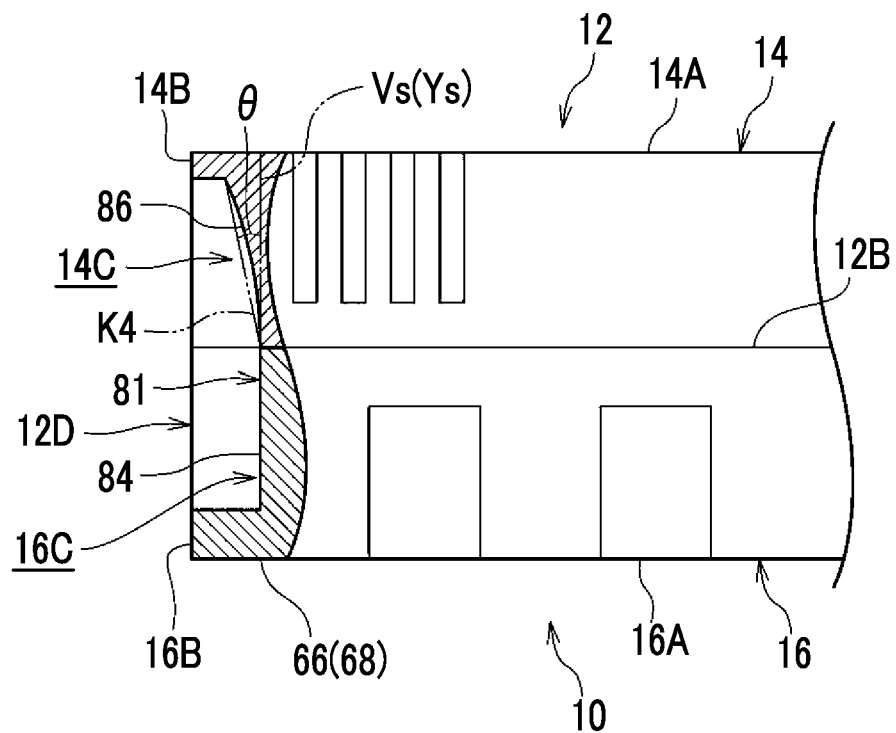
FIG. 14 is an enlarged side cross-sectional view illustrating the modification example of the label surface of the recording tape cartridge related to a fourth embodiment.

As illustrated in FIG. 13, in the label surface 81, only the first half label surface 82, not the second half label surface 84, is inclined at the inclination angle θ of one degree or more and 3.2 degrees or less with respect to the vertical plane Vs (refer to FIG. 3) or the reference plane Ys (refer to FIG. 3) in the side view. Specifically, the first half label surface 82 is a flat inclined surface (planar surface) that is inclined to the rear (the direction opposite to the loading direction to the drive device) toward the top plate 14A in the side view. In addition, illustration of the barcode label 100 is omitted in FIG. 13.

Here, the reason why the inclination angle θ of the first half label surface 82 is one degree or more, similarly to the above third embodiment, is that the occurrence of the above-described halation HL (refer to FIG. 16) cannot be prevented at a draft angle from the die in the first peripheral wall 14B of the first half 14 in a case where the first half 14 is molded by the die (not illustrated).

The reason why the inclination angle θ of the first half label surface 82, similarly to the above third embodiment, is set to 3.2 degrees or less is that the upper part of the barcode label 100 attached to the label surface 81 protrudes rearward from the first recess 14C to such a degree that the lower part is visually recognized in the side view if the inclination angle θ of the first half label surface 82 is made larger than 3.2 degrees.

In the label surface 81 related to the fourth embodiment configured as above, next, the operation (including a barcode reading method) thereof will be described. In addition, since the steps and operation of attaching the barcode label 100 to the label surface 81 are the same as those of the above second embodiment, the description thereof is omitted.

The recording tape cartridge 10 to which the barcode label 100 is attached to the label surface 81 is stored in the library. In a case where the recording tape cartridge 10 stored in the library is loaded into the drive device, the rear part of the recording tape cartridge 10 is gripped by the robot hand. Then, the barcode of the barcode label 100 attached to the label surface 81 of the rear wall 12D is read by the barcode reading device 90 (refer to FIG. 13) provided at the robot hand.

That is, light is radiated from the light source 92 of the barcode reading device 90 to a barcode label 100 (radiation step), and the reflected light reflected by the barcode label 100 is received by the light-receiving unit 94 of the barcode reading device 90 (light-receiving step). In addition, in the barcode reading device 90 in this case, the light-receiving unit 94 is disposed below the light source 92.

Here, in the recording tape cartridge 10 related to the fourth embodiment, the upper half of the barcode of the barcode label 100 is attached to the first half label surface 82 that constitutes the label surface 81. Therefore, these upper halves are inclined at the inclination angle θ (refer to FIG. 13) with respect to the vertical plane Vs or the reference plane Ys in the side view.

Hence, even in a case where light is radiated from the light source 92 to the barcode label 100 in order to read the barcode of the barcode label 100 attached to the label surface 81 by the barcode reading device 90, reflection of the light in the state close to the regular reflection in the barcode label 100 can be suppressed and prevented.

That is, the reflected light to be received by the light-receiving unit 94 being close to the regular reflection can be suppressed and prevented, and the reflected light can be appropriately (in a state the bars and the spaces of the barcode are distinguished from each other) received by the light-receiving unit 94. Hence, occurrence of poor reading in the barcode reading device 90 can be suppressed or prevented, and the reading performance (readability) for the barcode can be improved.

In addition, the first half label surface 82 illustrated in FIG. 13 is a planar surface (flat surface). However, as in a modification example illustrated in FIG. 14, the first half label surface 82 may be a first half label surface 86 formed as a curved surface (concave surface) that protrudes toward the inside (obliquely forward and upward) in the side view. Even in the case of the first half label surface 86 formed as the curved surface, the same effects as the above are obtained.

The inclination angle θ with respect to the vertical plane Vs or the reference plane Ys in the first half label surface 86 is an angle between a longest chord (illustrated by a phantom line K4 that connects an upper end and a lower end of the first half label surface 86) in the curved surface to each other. Additionally, the first half label surface 86 is not limited to the curved surface of a concave surface, and may be made into the curved surface of a convex surface.

The recording tape cartridge 10, the barcode reading system, and the barcode reading method related to the present embodiment have been described above with reference to the drawings. However, the recording tape cartridge 10, the barcode reading system, and the barcode reading method related to the present embodiment are not limited to the illustrated ones, and design changes can be appropriately made without departing from the spirit of the present disclosure.

For example, the barcode label 100 is not limited to the one-dimensional barcode label 100, and may be a two-dimensional barcode label (not illustrated). Additionally, in the recording tape cartridge 10 related to the present embodiment, both the vertical plane Vs and the reference plane Ys are used as references of the inclination angle θ. However, only any one of the vertical plane Vs and the reference plane Ys may be used.

What is claimed is:

1. A recording tape cartridge comprising:
a case that is configured by a first half in which a first peripheral wall is erected around a rectangular top plate and a second half in which a second peripheral wall is erected around a rectangular bottom plate being joined to each other in a state where the first peripheral wall and the second peripheral wall are butted against each other, and that stores a reel around which the recording tape is wound;
a label surface that is formed of a first half label surface of the first peripheral wall and a second half label surface of the second peripheral wall on a side opposite to a loading direction of the case to a drive device and that allows a label on which individual identification information is recorded with a one-dimensional or two-dimensional barcode to be attached thereto; and
a reference surface that is formed on the bottom plate and is used for positioning the case in a thickness direction in a case of being loaded into the drive device,
wherein the first half label surface or the second half label surface is inclined at one degree or more with respect to a vertical plane perpendicular to the reference surface as seen from a direction orthogonal to an axial direction of the reel and the loading direction to the drive device.

2. The recording tape cartridge according to claim 1, wherein the first half label surface or the second half label surface that is inclined at one degree or more with respect to the vertical plane is inclined in the loading direction toward the top plate or the bottom plate.

3. The recording tape cartridge according to claim 2, wherein the first half label surface is provided within a first recess formed in the first peripheral wall, the second half label surface is provided within a second recess formed in the second peripheral wall, and the first half label surface or the second half label surface that is inclined at one degree or more with respect to the vertical plane is inclined at 3.2 degrees or less with respect to the vertical plane.

4. The recording tape cartridge according to claim 1, wherein the first half label surface is provided within a first recess formed in the first peripheral wall, the second half label surface is provided within a second recess formed in the second peripheral wall, and the first half label surface or the second half label surface that is inclined at one degree or more with respect to the vertical plane is inclined at 3.2 degrees or less with respect to the vertical plane.

5. The recording tape cartridge according to claim 1, wherein the first half label surface or the second half label surface that is inclined at one degree or more with respect to the vertical plane is a planar surface.

6. The recording tape cartridge according to claim 1, wherein the first half label surface or the second half label surface that is inclined at one degree or more with respect to the vertical plane is a curved surface.

7. A barcode reading system comprising:
the recording tape cartridge according to claim 1;
a label that has individual identification information recorded thereon with a one-dimensional or two-dimensional barcode, and is attached to the label surface; and
a barcode reading device having a light source that radiates light to the label and a light-receiving unit that receives the reflected light reflected by the label.

8. A barcode reading method comprising:
a radiation step of radiating light from a light source of a barcode reading device to a label that has individual identification information recorded thereon in a one-dimensional or two-dimensional barcode and is attached to the label surface in the recording tape cartridge according to claim 1; and
a light-receiving step of receiving the reflected light reflected by the label by a light-receiving unit of the barcode reading device.

9. A recording tape cartridge comprising:
a case that is configured by a first half in which a first peripheral wall is erected around a rectangular top plate and a second half in which a second peripheral wall is erected around a rectangular bottom plate being joined to each other in a state where the first peripheral wall and the second peripheral wall are butted against each other, and that stores a reel around which the recording tape is wound;
a label surface that is formed of a first half label surface of the first peripheral wall and a second half label surface of the second peripheral wall on a side opposite to a loading direction of the case to a drive device and that allows a label on which individual identification information is recorded with a one-dimensional or two-dimensional barcode to be attached thereto; and
a pair of reference holes that is formed in the bottom plate so as to be spaced apart from each other in a direction orthogonal to the loading direction to the drive device as seen from an axial direction of the reel, and is used for positioning the case in the loading direction and the direction orthogonal to the loading direction in a case of being loaded into the drive device,
wherein the first half label surface or the second half label surface is inclined at one degree or more with respect to a reference plane passing through a central axis of the pair of reference holes as seen from a direction orthogonal to an axial direction of the reel and the loading direction to the drive device.

10. The recording tape cartridge according to claim 9, wherein the first half label surface or the second half label surface that is inclined at one degree or more with respect to the reference plane is inclined in the loading direction toward the top plate or the bottom plate.

11. The recording tape cartridge according to claim 10, wherein the first half label surface is provided within a first recess formed in the first peripheral wall, the second half label surface is provided within a second recess formed in the second peripheral wall, and the first half label surface or the second half label surface that is inclined at one degree or more with respect to the reference plane is inclined at 3.2 degrees or less with respect to the reference plane.

12. The recording tape cartridge according to claim 9, wherein the first half label surface is provided within a first recess formed in the first peripheral wall, the second half label surface is provided within a second recess formed in the second peripheral wall, and the first half label surface or the second half label surface that is inclined at one degree or more with respect to the reference plane is inclined at 3.2 degrees or less with respect to the reference plane.

13. The recording tape cartridge according to claim 9, wherein the first half label surface or the second half label surface that is inclined at one degree or more with respect to the reference plane is a planar surface.

14. The recording tape cartridge according to claim 9, wherein the first half label surface or the second half label surface that is inclined at one degree or more with respect to the reference plane is a curved surface.

15. A barcode reading system comprising:
the recording tape cartridge according to claim 9;
a label that has individual identification information recorded thereon with a one-dimensional or two-dimensional barcode, and is attached to the label surface; and
a barcode reading device having a light source that radiates light to the label and a light-receiving unit that receives the reflected light reflected by the label.

16. A barcode reading method comprising:
a radiation step of radiating light from a light source of a barcode reading device to a label that has individual identification information recorded thereon in a one-dimensional or two-dimensional barcode and is attached to the label surface in the recording tape cartridge according to claim 9; and
a light-receiving step of receiving the reflected light reflected by the label by a light-receiving unit of the barcode reading device.

\* \* \* \* \*